Aug. 13, 1929.  G. A. MORRIS  1,724,883
AIRPLANE
Filed June 27, 1928   2 Sheets-Sheet 1
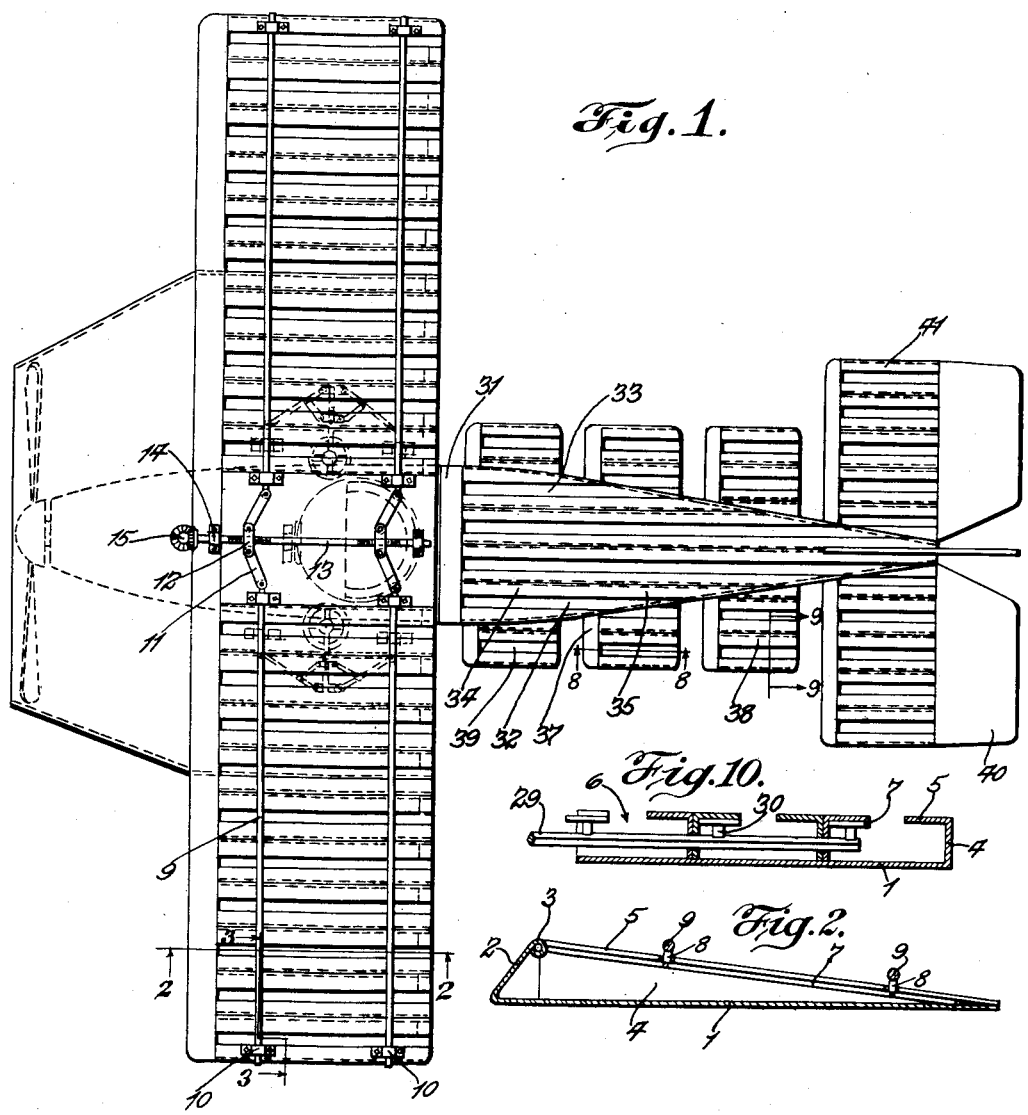
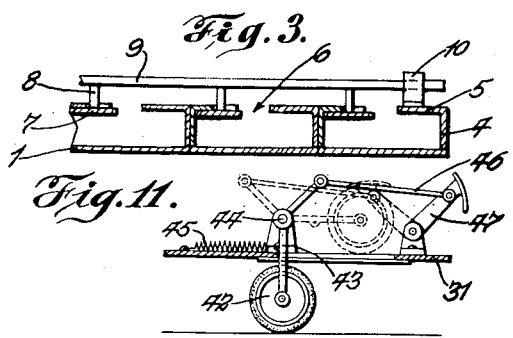
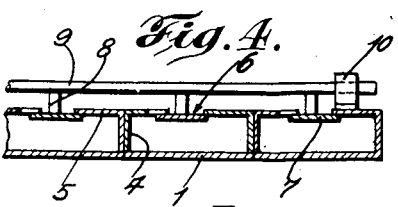
INVENTOR.
GEORGE A. MORRIS,
by Rippey & Kingsland,
HIS ATTORNEYS.

Aug. 13, 1929.　　　　G. A. MORRIS　　　　1,724,883
AIRPLANE
Filed June 27, 1923　　　2 Sheets-Sheet 2

INVENTOR.
GEORGE A. MORRIS.
by Rippey & Kingsland.
HIS ATTORNEYS.

Patented Aug. 13, 1929.

1,724,883

UNITED STATES PATENT OFFICE.

GEORGE A. MORRIS, OF ST. LOUIS, MISSOURI, ASSIGNOR OF ONE-HALF TO WILLIAM E. SCHAPER, OF ST. LOUIS, MISSOURI.

AIRPLANE.

Application filed June 27, 1928. Serial No. 288,669.

This invention relates to airplanes, and has special reference to the construction of the wings, and consists in the novel construction, combination and arrangement of parts herein disclosed.

An object of the invention is to provide an airplane with hollow wings, and means for opening and closing the upper wall of the wings in order to vary the speed and the lifting power of the machine.

Another object of the invention is to provide an airplane with wings of improved construction comprising means for moving one of the walls of the wings in order to control the machine in case of tail spin so that the machine may be readily righted and operated by the pilot.

Another object of the invention is to provide an airplane comprising a landing gear including wheels, and means for extending the wheels for use in case of landing and for withdrawing the wheels into the body or fuselage of the airplane to reduce air resistance during flight.

Other objects will appear from the following description, reference being made to the drawings in which Fig. 1 is a plan view of an airplane constructed in accordance with the present invention.

Fig. 2 is a cross sectional view from front to rear of one of the wings on the line 2—2 of Fig. 1.

Fig. 3 is a sectional view at right angles to that of Fig. 2 on the line 3—3 of Fig. 1 showing the wing open to obtain reduced speed and increase the lifting and carrying power of the airplane.

Fig. 4 is a similar sectional view showing the wing closed.

Fig. 10 is a sectional view similar to Fig. 3 showing the actuating devices for opening and closing the wings mounted between the upper and lower walls of the wings.

Fig. 11 is a view showing my improved landing gear.

Figure 5:
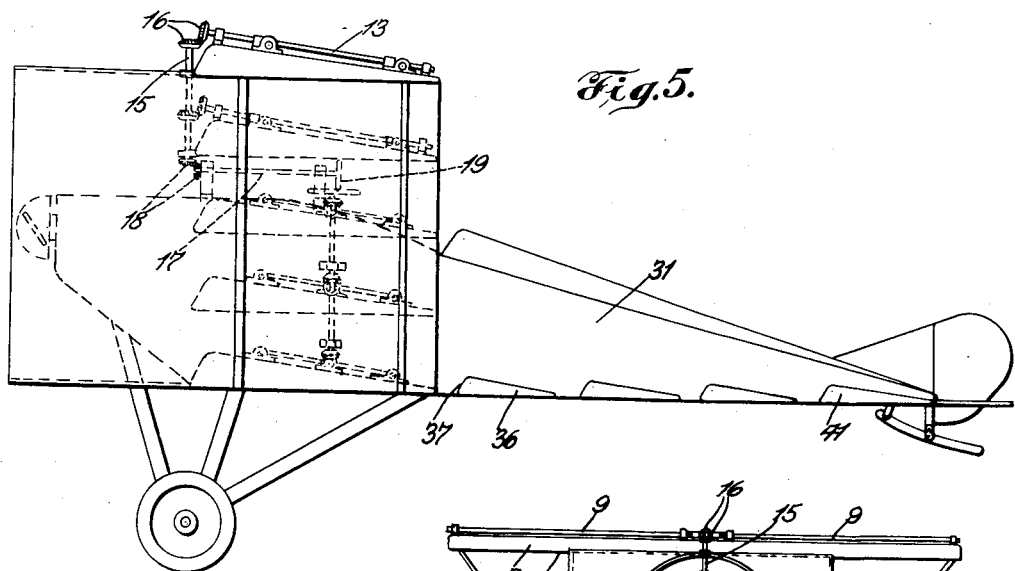
Fig. 5 is a side elevation of the airplane.
Figure 6:
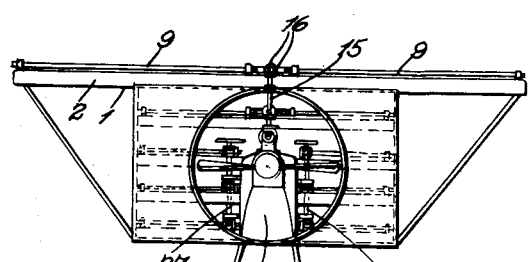
Fig. 6 is a front elevation of the airplane.
Figure 7:
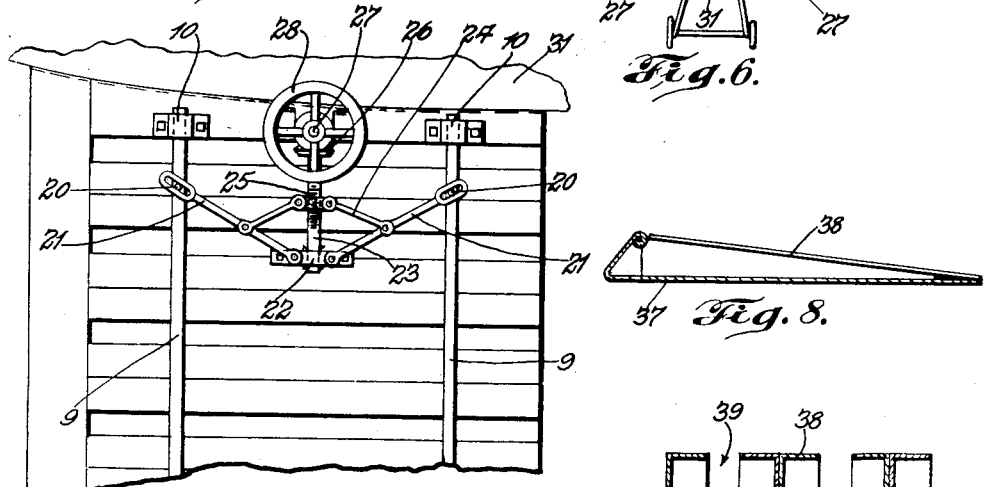
Fig. 7 is a plan view of the mechanism for operating the devices for opening and closing the wings.
Figure 8:
Fig. 8 is a sectional view of a wing on the line 8—8 of Fig. 1.
Figure 9:
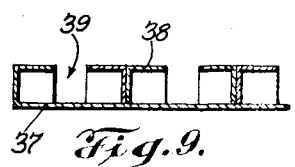
Fig. 9 is a sectional view on the line 9—9 of Fig. 1.

Each of the principal wings of my improved airplane is hollow and comprises a lower wall 1, the front edge of which inclines upwardly and rearwardly to provide a wall 2 terminating in a reinforcement 3. From the reinforcement 3 a number of angular partition- and wall-forming elements extend toward the rear edge of the wing. As shown, each of said elements comprises a vertical partition-forming angle 4 tapering from maximum vertical width at its front end toward the rear of the wing; and an upper laterally extending wall-forming flange 5. The adjacent edges of the respective flanges 5 are spaced apart, leaving openings 6 between the lower wall 1 and the upper wall of the wing.

My invention comprises means for opening and closing the openings 6, the same including slides 7, each attached to the ends of arms 8 extending from corresponding longitudinally movable rods 9. In the embodiment shown in Figs. 1, 3 and 4 the rods 5 are mounted for longitudinal sliding movements in bearings 10 attached to the flanges 5. These arms 8 extending from the longitudinally movable rods 9 hold the slides 7 spaced according to the spacing of the openings 6. The inner ends of the respective rods 9 are pivoted to the outer ends of links 11. The inner ends of the links 11 are pivoted to collars or nuts 12 screwed on a shaft 13 journaled for rotation in bearings 14. From this it is obvious (Fig. 1) that when the shaft 13 is rotated in one direction the nuts or collars 12 will be operated along said shaft to move all of the rods 9 longitudinally in an outward direction, thus moving the slides 7 to position to close the openings 6 and provide hollow wings having a continuous lower wall and a substantially continuous upper wall. By rotating the shaft 13 in the opposite direction all of the rods 9 will be moved longitudinally in an inward direction, thus moving the slides 7 from the position shown in Fig. 4 to the positions shown in Fig. 3, thus providing openings 6 in the upper walls of the respective wings.

The shaft 13 may be rotated by any desired mechanism as by a vertical shaft 15 geared to the shaft 13 by beveled gearing 16 and to a shaft 17 by beveled gearing 18, said shaft 17 having a hand wheel 19 thereon for manual engagement in order to rotate said shaft. The shaft 15 may be similarly geared to similar operating devices of other wings, as indicated in Fig. 5.

In Fig. 5 I have indicated by broken lines a lower series of wings of similar construction and arrangement but a different form of operating mechanism for the rods 9. In this construction each of the rods 9 has pin-and-slot connection 20 with one end of a link 21. The opposite ends of the links 21 are pivoted to a stationary bearing 22 for a rotary shaft 23. Links 24 pivotally connect the respective links 21 with a nut or collar 25 screwed on the shaft 23, so that when said shaft is rotated in one direction the rods 9 will be moved outwardly in a longitudinal direction to close the slides 7; and when the shaft 23 is rotated in the opposite direction the rods 9 will be moved longitudinally in an inward direction to move the slides 7 to obtain open wings (Fig. 10). Each of the shafts 23 is geared by beveled gearing 26 to a shaft 27 equipped with a hand wheel 28 for rotating the same. It is obvious that, instead of mounting the rods 9 in bearings 10 on top of the wings, said rods may be otherwise mounted. For instance, in Fig. 10, rods 29 corresponding to the rods 9 are shown mounted for sliding movements in openings in the flanges 4 and provided with arms 30 attached to the slides 7. The rods 29 may be moved longitudinally in inward and outward directions by the same mechanism previously described.

The airplane shown comprises a fuselage 31, the upper rear side of which comprises a wall 32 provided on its upper side with longitudinal chambers or compartments 33 obtained by attaching to the upper wall 32 the vertical flanges 34 of angle members, the laterally extended flanges 35 of which are spaced to leave openings to the compartments 33.

The fuselage may also be equipped with comparatively short laterally extended wings comprising lower walls 36 having their front edges extending upwardly and rearwardly to provide walls 37. To the walls 36 angle members 38 are secured so as to provide longitudinal, that is, front to rear, open compartments or chambers 39 similar to those on the upper side of the fuselage.

The elevators 40 are pivoted to stabilizers 41 longer than the wings at the sides of the fuselage, but of similar construction.

The landing gear shown in Fig. 11 comprises wheels 42 attached to angular arms 43 pivoted intermediate of their length at 44 and actuated in a direction and to a position to hold the wheels 42 extended for landing, by springs 45. The upper ends of the arms 43 are pivoted to one end of a link 46, the opposite end of which is pivoted to the lever of a foot pedal 47 which is operative to swing the wheels 42 into the fuselage so as to reduce air resistance during flight. When the pedal 47 is released the springs 45 retract and extend the wheels 42 to position for landing.

Figure 12:
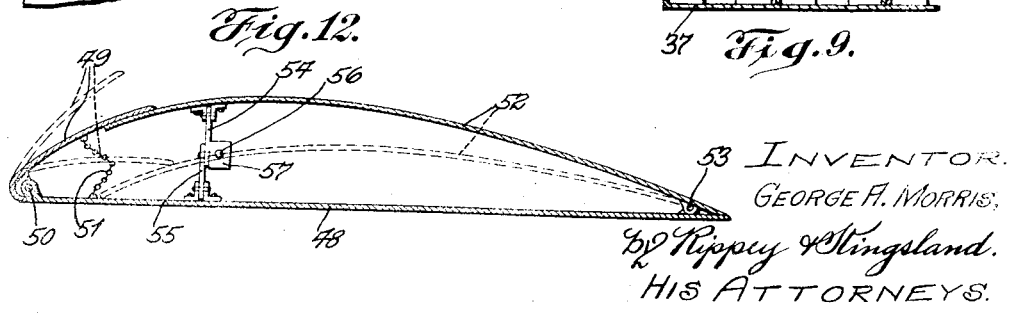
Fig. 12 is a front to rear vertical sectional view of a different form of wing.

A different form of wing is shown in Fig. 12 capable of use for different purposes. This wing is of the hollow type and comprises a bottom wall 48 having a curved wall 49 connected with its front edge by hinge connection 50 and being capable of swinging movements toward and away from the wing 48. A chain 51 connecting the wall 49 with the wall 48 limits extent of movement of the wall 49 from the wall 48.

Another wall 52 of appropriate shape has its rear edge connected with the rear edge of the wall 48 by hinge connection 53 and has its front edge overlapped by the rear edge of the wall 49. A number of pivotally connected toggle devices comprises upper links 54 having their upper ends pivoted to the inner sides of the wall 52 near its front edge, and links 55 having their upper ends pivoted to the lower ends of the links 54 and having their lower ends pivoted to the wall 48 operative to move the wall 52 to different adjustments. The mechanism for operating the toggle links may comprise a rod 56 screwed through ears 57 projecting laterally from the toggle links 54. The rod 56 being immovable longitudinally and being rotative, it is obvious that when said rod is turned in one direction the toggle links will be extended; and when the rod 56 is turned in the other direction the toggle links will be folded. When the toggle links are extended the walls 52 and 49 are in the relationship shown in Fig. 12; and when the toggle links are folded the walls 52 and 49 may assume the positions shown in dotted lines in Fig. 12.

In case of tail spin or the like the air resistance against the under side of the rear edge of the wall 49 will open the wall 49, as shown in dotted lines (Fig. 12), thus reducing the speed of the tail spin and enable the pilot to right and to control the machine.

The invention may be otherwise varied widely within equivalent limits without departure from the nature and principle thereof. I do not restrict myself in unessential respects, but what I claim and desire to secure by Letters Patent is:—

1. An airplane comprising a fuselage having an upper wall, means forming a number of chambers extending longitudinally from front to rear along the upper side of said upper wall, and a wing for sustaining the airplane in flight and having a number of longitudinal chambers or compartments extending from front to rear in its upper side.

2. An airplane comprising a fuselage having an upper wall, means forming a number of chambers extending longitudinally from front to rear along the upper side of said upper wall, a wing for sustaining the airplane in flight and having a number of longitudinal chambers or compartments extending from front to rear in its upper side, and means for opening and closing said chambers in said wing.

3. A wing for airplanes comprising a lower wall, a vertical partition rising from said lower wall and tapering from maximum vertical width at their front ends toward the rear, means in connection with the upper edges of said partitions forming an upper wall for the wing having openings to the spaces between the respective partitions, a laterally movable slide for opening and closing each of said openings, and mechanism for operating said slides laterally to open and to close said openings.

4. A wing for airplanes comprising a lower wall, a number of partitions rising from said lower wall and extending from front to rear, means in connection with the upper edges of said partitions forming an upper wall having openings therethrough between the respective partitions, slides movable laterally to and from position to close said openings, inwardly and outwardly longitudinally movable rods connected with said slides, a rotary shaft, elements screwed on said shaft for longitudinal movements thereon, links pivotally connecting said rods with said elements, and mechanism for rotating said shaft and thereby moving said elements longitudinally along said shaft.

5. An airplane comprising a fuselage, a number of wings in connection with the front portion of said fuselage for sustaining the same in flight, and a number of comparatively short laterally extended wings in connection with the fuselage rearwardly of said first named wings and each having a number of front to rear chambers therein opening upwardly.

6. An airplane comprising a fuselage, a number of wings in connection with the front portion of said fuselage for sustaining the same in flight, a number of comparatively short laterally extended wings in connection with the fuselage rearwardly of said first named wings and each having a number of front to rear chambers therein opening upwardly, and a stabilizer in connection with the rear end of the fuselage of greater length than said second named wings and having a number of front to rear chambers therein opening upwardly.

7. An airplane comprising a fuselage, wings extending laterally from said fuselage for sustaining the same in flight, a plurality of chambers in each of said wings extending from front to rear and opening upwardly laterally beyond the sides of the fuselage, laterally movable slides for opening and closing said chambers simultaneously, and means for holding said slides spaced according to the spacing of the openings from said chambers and for operating said slides simultaneously to open and to close said chambers.

GEORGE A. MORRIS.